United States Patent [19]
Kim et al.

[11] Patent Number: 5,932,503
[45] Date of Patent: Aug. 3, 1999

[54] GLASS COMPOSITION FOR PLASMA DISPLAY PANEL

[75] Inventors: Ki Dong Kim, Seoul; Chan Jong Lee, Suwon; Hyun Min Jung, Seoul; Ki Chul Seo, Suwon, all of Rep. of Korea

[73] Assignee: Samsung Corning Co., Ltd., Kyungki-do, Rep. of Korea

[21] Appl. No.: 08/986,236

[22] Filed: Dec. 5, 1997

[30] Foreign Application Priority Data

Dec. 5, 1996 [KR] Rep. of Korea ................. 96-62074

[51] Int. Cl.$^6$ .................................................. C03C 3/087
[52] U.S. Cl. ................................................ 501/70; 501/69
[58] Field of Search ................................. 59/69, 70, 72

[56] References Cited

U.S. PATENT DOCUMENTS

| | | | |
|---|---|---|---|
| 4,390,637 | 6/1983 | Daiku | 501/64 |
| 5,468,693 | 11/1995 | Comte | 501/69 |
| 5,599,754 | 2/1997 | Maeda et al. | 501/69 |

FOREIGN PATENT DOCUMENTS

| | | |
|---|---|---|
| 795522 A1 | 9/1997 | European Pat. Off. . |
| 3-40933 | 2/1991 | Japan . |
| 8-165183 | 6/1996 | Japan . |

*Primary Examiner*—Michael Marcheschi
*Attorney, Agent, or Firm*—Pillsbury Madison & Sutro LLP

[57] ABSTRACT

This invention relates to a glass composition for plasma display panel and more particularly, to a glass composition for plasma display panel having the following physical properties of glass without containing SrO in principle, i.e., strain point: 580~610° C.; transition point: 610° C. or more; thermal expansion coefficient: $80\sim87\times10^{-7}/°C$.; working temperature equivalent to 10,000 poise: 1,200° C. or less; liquidus temperature: 1,100° C. or more; viscosity at liquidus temperature: 20,000 poise or more.

7 Claims, No Drawings

5,932,503

GLASS COMPOSITION FOR PLASMA DISPLAY PANEL

BACKGROUND OF THE INVENTION

1. Field of the Invention

This invention relates to a glass composition for plasma display panel and more particularly, to a glass composition for plasma display panel with the following physical properties of glass, while containing no SrO in principle:

strain point is in the range of 580~610° C.;

transition point is more than 610° C.;

thermal expansion coefficient is 80~87×10$^{-7}$/°C.;

working temperature, being equivalent to 10,000 poise, is less than 1,200° C.;

Liquidus temperature is less than 1,100° C.;

The viscosity at a liquidus temperature is more than 20,000 poise.

2. Description of the Prior Art

A plasma display panel belongs to a technology for vacuum fluorescent display, the gists of which are constructed in such a manner that a gas filled between two glass substrates, being maintained at closely packed vacuum state, is ionized by electric discharge and ultraviolet rays are formed. Then, the discharged ultraviolet rays collide with a fluorescent material, being coated within a glass plate, and are transformed into visible rays, thus showing the image in the screen. According to the basic structure of a general plasma display panel, it comprises;

two glass substrates spaced apart from each other by a distance of 100~150 μm, each of which thickness is 2~3 mm;

the brims closely packed by frit sealing;

the inside of one glass, showing the image, coated with indium tin oxide (ITO) which functions as a data electrode;

the inside of one glass coated address electrode such as Ni, Ag paste and a fluorescent material which serves to develop red, green blue colors.

As far as a glass composition for plasma display panel is concerned, a soda lime silicate sheet glass ($SiO_2$: 70~72 wt %, $Al_2O_3$: 1~2 wt %, $Na_2O$: 12~14 wt %, $K_2O$: 0~1 wt %, CaO: 8~9 wt %, MgO: 4~5 wt %) for the use of construction and automobiles, being made available by a float process, was initially applied to a small-size (21") plasma display panel in consideration of some natures of paste or frit used in the process of manufacturing the plasma display panel, such as the thermal expansion coefficient and melting point of the soda lime silicate sheet glass, in particular.

In spite of the fact that demand for a large-size display and high resolution has been increasing, since changes in dimension and flatness and degradation resolution thereof due to shrinkage of the glasses occur in the middle of the multiple firing required in the display fabrication, the soda lime silicate based sheet glass has failed to meet the requirements related to the glass composition for plasma display panel.

The process for manufacturing the plasma display panel is performed at more than 570° C. Since the soda lime silicate based sheet glass has a strain point of 510~530° C. (temperature equivalent to $10^{14.5}$ poise as viscosity), a temperature causing the strain of glass on heat, changes in the dimension and flatness of the substrate glass during the multiple firing required in the display fabrication may occur. And these variations in cell gap width lead to variations in the electrical characteristics of the cell, resulting in color variation, in the long run, to dead pixels.

Therefore, it is preferred that the glass composition for plasma display panel has a strain point of more than 570° C. with the thermal expansion coefficient in the range of 80~90×10$^{-7}$/°C. so as to be suitable for the conventional paste and frit.

The conventional methods designed to manufacture a glass composition for plasma display panel were disclosed in the U.S. Pat. No. 5,459,109 and Japanese UnExamined Patent Publication Hei 3-40933, Hei 8-133778 and Hei 8-165138 and their chemical compositions are shown in the following table 1.

First, the U.S. Pat. No. 5,459,109 based on the float process, a sheet glass based forming technology, had a chemical composition containing no alkaline metal oxide in principle with the following physical properties:

strain point: more than 600° C.;

thermal expansion coefficient in the range of 0~300° C.: 70~90×10$^{-7}$/°C.

temperature at 10,000×10$^6$ poise: less than 1,240° C.;

viscosity at a liquidus temperature: more than 3,000×10$^6$ poise.

Nevertheless, this patent has recognized some disadvantages in that a) in spite of the fact that the strain point described in the patent claims was more than 600° C., excessively high strain points showing more than 630° C. were described in the examples, b) there was a extremely low thermal expansion coefficient of less than 80×10$^{-7}$/°C., and c) even though the liquidus temperature was lower than the working temperature, the viscosity at a liquidus temperature showed less than 15,000 poise, being far lower than 20,000 poise which are desirable in a sheet glass based forming technology. In addition, this patent described that the viscosity values at both working and liquidus temperatures were 10,000×10$^6$ poise and 3,000×10$^6$ poise, respectively, which did not entirely correspond with those of the examples and unreal values that could not be applied in the actual production. Furthermore, as shown in the examples, this patent employed halides (F and Cl) as a fining agent which might cause environmental problems. Further, as shown in the following table 1, a total content of alkaline earth materials such as MgO, CaO, SrO and BaO were in the range of 45.5~52.5 wt % and instead of MgO and CaO, natural raw materials, the content of extremely highly-priced SrO and BaO occupied more than 80%. In this respect, any economical benefits are not expected due to the increase in the whole raw material costs. Further, excessive amount of alkaline earth material facilitates the refractory erosion, thus resulting in decreasing the strain point or increasing expansion coefficient, as mentioned in the above. Also, since the $B_2O_3$ content, showing 4.5 wt % at maximum was relatively high, its evaporation during the melting process, is expected to cause the refractory erosion in a melting chamber and the refractory erosion in a tin chamber and some glass defects in the process of manufacturing a sheet glass by means of the process.

The Japanese UnExamined Patent Publication Hei 3-40933 disclosed the chemical composition only as shown in the following table 1. Its examples referred to the results of several compositions covering the strain point, softening point, thermal expansion coefficient, electric resistance and thermal deformation amount but there was no description on the sheet glass based forming technology for intended application elsewhere. As far as the claimed ranges of the chemical composition were concerned, a total content of $Li_2O$, $Na_2O$ and $K_2O$ was described only as alkali oxide and in case of alkaline earth material oxide, a total content of MgO, SrO and BaO including CaO were only described but with the range of CaO specified in more detail. Of 7 among 8 compositions described in the examples, there was no statement on some thermal properties such as the strain point and thermal expansion coefficient related to the glass composition for plasma display panel, compared to a soda lime silicate glass.

The chemical composition of the Japanese UnExamined Patent Publication Hei 8-133778 did not contain $ZrO_2$ in principle. According to the patent claims, the strain point was more than 560° C. and thermal expansion coefficient in the range of 50~300° C. was 80~95×10$^{-7}$/°C. In addition, its examples referred to the results of various temperatures at 100 and 10,000 poises, liquidus temperature, chemical durability and hardness, while the application of the float process was tacitly described. Instead of containing no $ZrO_2$ substantially, this patent is intended for improving the hardness of glass with the addition of 0~6 wt % ZnO but according to Europe Patent Nos. 559,389 and 510,543 and the U.S. Pat. No. 5,387,560, ZnO has been reported to cause some defects at the surface of a sheet glass, since its reduction in the tin chamber occurs, when a float process, a sheet glass based forming technology is applied. The correlationship between $ZrO_2$ and ZnO affecting the hardness is quite unclear, when the values on hardness specified in the examples and comparative examples are reviewed, while $ZrO_2$ has been reported to improve the hardness of glass, on the contrary, according to some literature[Chemical Approach to Glass, Milos Volf, Elsevier, 1984, pp. 306~314].

Further, its examples described that though the liquidus temperature was lower than the working temperature, it is nearly impossible to predict any productivity due to the fact that the viscosity at a liquidus temperature was not mentioned elsewhere.

The Japanese UnExamined Patent Publication Hei 8-165138 did contain $ZrO_2$ as an improved patent of Hei 3-40933 and its examples described the results of thermal properties such as transition point, expansion coefficient, viscosity at high temperature and liquidus viscosity including the application of the float process, a sheet glass based forming technology. However, there was no description on the strain point, being considered as an important factor in the glass composition for plasma display panel and furthermore, there was no description on the viscosity at a liquidus temperature, a criterion of forming productivity when the float process was applied.

TABLE 1

| Composition | U.S. Pat. No. 5,459,109 | Japanese UnExamined Pat. Pub. Hei 3-40933 | Japanese UnExamined Pat. Pub. Hei 8-133788 | Japanese UnExamined Pat. Pub. Hei 8-165138 |
|---|---|---|---|---|
| $SiO_2$ | 39~43 | 55~65 | 45~66 | 52~62 |
| $Al_2O_3$ | 2.5~9.5 | 5~15 | 0~15 | 5~12 |
| $B_2O_3$ | 1.5~4.5 | — | — | — |
| $Li_2O$ | — | — | 0~0.5 | 0~1 |
| $Na_2O$ | — | — | 0~6 | 0~6 |
| $K_2O$ | — | — | 4~20 | 4~12 |
| $Li_2O + Na_2O + K_2O$ | — | 6~12 | 10~24 | 7~14 |
| MgO | 0~1.5 | — | 0~6 | 0~4 |
| CaO | 0~2.5 | 3~12 | 0~14 | 3~5.5 |
| SrO | 10.5~21.5 | — | 1~14 | 6~9 |
| BaO | 25.5~39.0 | — | 0~14 | 0~13 |
| ZnO | — | — | 0~6 | — |
| MgO + CaO + SrO + BaO | 45.5~52.5 | 17~25 | — | 17~27 |
| MgO + CaO + SrO + BaO + ZnO | — | — | 14~31 | — |
| $ZrO_2$ | — | 0.6~6.0 | — | 0.2~6.0 |
| $SO_3$ | — | — | — | 0~0.6 |
| $SO_3 + Sb_2O_3$ | — | — | 0~1 | — |
| $SO_3 + Sb_2O_3 + As_2O_3$ | — | 0~0.5 | — | — |
| $SnO_2 + TiO_2$ | — | 0~3 | — | — |
| $La_2O_3$ | — | 0~5 | — | — |
| refining agent | 0~1.5 | — | — | — |

In line with such soda lime silicate composition, if the alkali contents such as $Na_2O$ and $K_2O$ are reduced so as to increase the strain point and lower BaO, $ZrO_2$ and $Al_2O_3$ are increased the raw materials cost will significantly increase and the overall increases in a temperature related to the melting and molding of glass and liquidus temperature will result in poor productivity of glass. In case of adding $B_2O_3$, the melting of glass becomes easier but its increased amount will be responsible for a refractory erosion by evaporation and glass defects thereof. In particular, the addition of ZnO is not preferable in a float process, a sheet glass based forming technology.

With a view to overcoming these defects in the conventional methods, the present inventor et al. carried out extensive studies to fully cope with the float process, a sheet glass based forming technology, by increasing the strain point of glass and reducing the thermal expansion coefficient. In consequence, the present inventor et al. completed this invention to manufacture a glass composition which enables to improve various physical properties as follows:

the working temperature is 1,200° C. or less, in spite of the fact that SrO, high-priced chemical raw material, is not contained in principle, the liquidus temperature is lower than the working temperature, the viscosity at liquidus temperature is adjusted to 20,000 poise or more.

SUMMARY OF THE INVENTION

Therefore, an object of this invention to provide a glass composition designed to meet the following properties of plasma display panel with relatively reasonable raw material costs:

In spite of the fact that the liquidus temperature is lower than the working temperature, a higher viscosity at a liquidus temperature results in enhancing better productivity;

the glass composition of this invention shows a higher strain point and lower expansion compared to the general sheet glass of soda lime silicate.

DETAILED DESCRIPTION OF THE INVENTION

This invention relates to a glass composition for plasma display panel, wherein it comprises: 56.0~63.0 wt % of $SiO_2$, 1.0~5.0 wt % of $Al_2O_3$, 3.0~7.0 wt % of $Na_2O$, 3.0~8.0 wt % of $K_2O$, 3.0~5.0 wt % of MgO, 4.0~8.0 wt % of CaO, 7.0~13.0 wt % of BaO, 3.0~8.0 wt % of $ZrO_2$, and 0.3~0.5 wt % of $Sb_2O_3$ and $SO_3$, expressed in terms of weight percent on the oxide basis.

According to this invention, a glass composition for plasma display panel comprising the above chemical composition has the following physical properties, i.e., a working temperature equivalent to 10,000 poise: 1,200° C. or less; strain point: 580~610° C.; thermal expansion coefficient at 30~350° C.: 80~87×10$^{-7}$/°C. Further, the glass composition of this invention is characterized in that in addition to the above components, trace amounts of $P_2O_5$, $La_2O_3$, $TiO_2$, $SnO_2$, $Fe2O_3$, CoO, NiO and $Nd_2O_3$ may be added to the active substances by 0.5 wt %, respectively or via artificial addition.

Each chemical composition comprising a glass composition of this invention is explained as follows:

According to this invention, the glass composition for plasma display panel does not in principle contain a) ZnO which is unsuitable for the tin chamber of a float process, a sheet glass based forming technology, b) $As_2O_3$ and F which aggravate the environmental problem as a refining agent, and c) high-priced SrO. Hence, the expression "does not in principle contain" means that with the use of barium carbonate related to the supplying material of BaO, any substance is not artificially added except for additionally provided SrO amount (about 1% by wt %).

$SiO_2$, an essential oxide involved in the formation of glass, functions to stabilize the networking structure of glass. $SiO_2$ is contained in the glass composition as 56.0~61.0 wt %. If its content is less than 56.0 wt %, the chemical durability of glass becomes decreased, while increasing the thermal expansion coefficient; however, in case of exceeding 61.0 wt %, there is a trend that the melting property becomes decreased, while increasing the liquidus temperature.

$Al_2O_3$ is used for a) maintaining the lowest possible liquidus temperature, b) lowering the expansion coefficient, and c) enhancing the strain point. If its content exceeds 5.0 wt %, the fusibility becomes lowered with drastic reduction in the expansion coefficient. Thus, it is preferred that the $Al_2O_3$ content is in the range of 1.0~5.0 wt %.

$Na_2O$ and $K_2O$ are highly effective in adjusting the thermal expansion coefficient of the glass and the viscosity at a high temperature. It is preferred that both contents of $Na_2O$ and $K_2O$ are in the ranges of 3.0~7.0 and 3.0~8.0 wt %, respectively. Further, a total amount of both $Na_2O$ and $K_2O$ should be maintained in the range of 8.0~12.0 wt %. If their total content is less than 8.0 wt %, the melting property tends to be poor, and in case of exceeding 12.0 wt %, the thermal expansion coefficient tends to increase, which the strain point tends to reduce, such being undesirable.

Since MgO, CaO and BaO are effective in decreasing the viscosity of glass at a higher temperature and enhancing the viscosity of glass at a lower temperature, they are used for the improvement of the melting property and enhancement of the strain point.

However, if excessive amount of both MgO and CaO is used, there is an increasing trend in the phase separation and devitrification of glass. In this respect, it is preferred that MgO and CaO are in the ranges of 3.0~5.0 wt % and 4.0~8.0 wt %, respectively. In order to use dolomite($CaCO_3MgCO_3$) as a raw material, inexpensive natural material, both CaO and MgO are added the molar ratio of CaO/(MgO+CaO) is 0.5. It is preferred that the BaO content is in the range of 7.0~13.0 wt %. A total amount of MgO, CaO and BaO is desirably in the range of 18.0~23.0 wt %.

$ZrO_2$ is effective in decreasing the thermal expansion coefficient and improving the hardness of glass surface but a large amount of $ZrO_2$ leads to be poor the melting property of glass, while increasing the viscosity of glass at a high temperature. It is preferred that the $ZrO_2$ content is in the range of 3.0~8.0 wt %.

Further, $Sb_2O_3$ and $SO_3$, which may optionally be used, are refining agent. It is preferred that a total amount of both $Sb_2O_3$ and $SO_3$ is in the range of 0.3~0.5 wt %.

According to this invention, the glass composition containing the above components may improve various physical properties related an display substrate glass based on the method of a plasma display panel. Hence, such various physical properties are based on the following conditions:

the working temperature, being equivalent to 10,000 poise, is less than 1,200° C.;

the liquidus temperature is less than 1,100° C.;

the viscosity value at a liquidus temperature for the molding productivity of glass is more than 20,000 poise;

the strain point for the prevention of a substrate deformation generated from the process of manufacturing the plasma display panel is 580~610° C.;

the transition point is more than 610° C.;

the thermal expansion coefficient at 30~350° C. is 80~87× $10^{-7}$/°C.

This invention is explained in more detail based on the following Examples as set forth hereunder but it is not limited by the above Examples.

EXAMPLES 1~6

By the chemical composition as described in the following table 2, each component was weighed to be 500 g per batch. After mixing all components by a V-mixer, the mixture was charged to 500 cc of platinum crucible and melted at an electric chamber at 1,450~1,550° C. for 3 hours. The melting material was poured into a graphite mold of 100×100×20 mm for molding. Then, the molding material at an electric chamber was kept at 650° C. for 2 hours and the temperature until 350° C. was lowered by 5° C. per minute, thus effecting the annealing. In this way, the glass composition was manufactured.

As shown in the following table 3, the comparative example 1 indicates the soda lime silicate based float sheet glass for construction and automobile. The comparative 2 indicates the chemical compositions of the U.S. Pat. No. 5,459,109, while the chemical compositions of the Japanese UnExamined Patent Publication Hei 8-165138 and Hei 8-133778 are shown in the Comparative Examples 3~5 and 6~7, respectively.

Further, the following tables 2 and 3 represent the physical properties of each glass composition manufactured based on the Examples and Comparative Examples: strain point, annealing point, softening point, thermal expansion coefficient, dielectric constant, viscosity at high temperature, liquidus temperature and viscosity at a liquidus temperature. Hence, the strain point(temperature equivalent to $10^{14.5}$ poise) and the annealing point(temperature equivalent to $10^{13}$ poise) were measured by the method of ASTM C336-71. The softening point(temperature equivalent to $10^{7.6}$ poise) was measured by the method of ASTM C338-73 and by the method suggested by the related U.S. Pat. No. 4,259,860. The transition point equivalent to thermal expansion coefficient at 30~350° C. and $10^{13.3}$ poise, respectively, was measured by the method of DIN 51045. The dielectric constant was measured by the method of contacting electrode. Further, the viscosity at high temperature was measured by the rotation method of DIN 52312. The liquid phase temperature was measured by the method of ASTM C829-81.

Further, from the following tables 2 and 3, the melting temperature represents a temperature equivalent to 100 poise and the working temperature represents a temperature at which the viscosity 10,000 poise. The viscosity values at a liquidus temperature was calculated by the dependent formula of viscosity on temperature:

$$\log \eta = A + B/(T-T_0)$$

where $\eta$ is the viscosity, A, B and $T_0$ are the constants, and T is the temperature(°C.).

TABLE 2

| Classification | Example | | | | | |
|---|---|---|---|---|---|---|
| | 1 | 2 | 3 | 4 | 5 | 6 |
| Glass composition (wt %) | | | | | | |
| $SiO_2$ | 57.28 | 57.17 | 58.75 | 60.81 | 60.58 | 60.48 |
| $Al_2O_3$ | 2.87 | 3.83 | 4.92 | 2.03 | 2.02 | 1.01 |
| $B_2O_3$ | 0 | 0 | 0 | 0 | 0 | 0 |
| $Li_2O$ | 0 | 0 | 0 | 0 | 0 | 0 |
| $Na_2O$ | 4.31 | 4.31 | 3.94 | 4.06 | 3.03 | 3.03 |
| $K_2O$ | 6.51 | 6.51 | 6.40 | 6.60 | 8.00 | 8.00 |
| MgO | 4.79 | 4.79 | 4.92 | 4.06 | 4.04 | 4.04 |
| CaO | 6.70 | 7.66 | 7.87 | 5.58 | 5.56 | 5.56 |
| SrO | | | | | | |
| BaO | 9.58 | 9.58 | 8.86 | 10.16 | 10.11 | 10.11 |
| ZnO | | | | | | |
| $ZrO_2$ | 7.66 | 5.75 | 3.94 | 6.10 | 6.06 | 7.07 |
| $P_2O_5$ | 0 | 0 | 0 | 0.3 | 0.3 | 0.3 |
| $Sb_2O_3$ | 0.3 | 0.2 | 0.4 | | | 0.2 |
| $SO_3$ | | 0.2 | | 0.3 | 0.3 | 0.2 |
| $As_2O_3$ | | | | | | |
| Cl | | | | | | |
| F | | | | | | |
| strain point(° C.) | 603 | 582 | 581 | 593 | 601 | 599 |
| transition point(° C.) | 629 | 612 | 608 | 621 | 630 | 627 |
| annealing point(° C.) | 636 | 620 | 615 | 629 | 638 | 635 |
| softening point(° C.) | 837 | 838 | 822 | 838 | 849 | 843 |
| thermal expansion coefficient($\times 10^{-7}$ ° C.) | 85.0 | 86.9 | 86.7 | 83.3 | 86.5 | 84.6 |
| dielectric constant(1 MHz) | 7.45 | 7.68 | 7.81 | 7.56 | 8.02 | 6.36 |
| melting temp. (° C.): 100 poise | 1,551 | 1,524 | 1,532 | 1,506 | 1,527 | 1,519 |
| working temp. (° C.): 10,000 poise | 1,160 | 1,142 | 1,146 | 1,139 | 1,156 | 1,154 |
| liquidus temp.(° C.) | 1,081 | 1,020 | 1,090 | 1,069 | 1,082 | 1,058 |
| viscosity(poise at liquidus temp.) | 53,703 | 36,982 | 27,378 | 39,904 | 41,686 | 69,183 |

TABLE 3

| Classification | Comparative Example | | | | | | |
|---|---|---|---|---|---|---|---|
| | 1 | 2 | 3 | 4 | 5 | 6 | 7 |
| Glass composition (wt %) | | | | | | | |
| $SiO_2$ | 72.5 | 41.5 | 55 | 58 | 57.6 | 57.2 | 53.8 |
| $Al_2O_3$ | 2 | 4.66 | 13 | 10 | 7.1 | 5.6 | 5.6 |
| $B_2O_3$ | 0 | 3.53 | 0 | 0 | 0 | 0 | 0 |
| $Li_2O$ | 0 | 0 | 2 | 0 | 0 | 0 | 0 |
| $Na_2O$ | 12.5 | 0 | 8 | 4 | 4.02 | 0 | 1.0 |
| $K_2O$ | 1 | 0 | 0 | 6 | 6.37 | 10.6 | 9.4 |
| MgO | 4 | 0 | 2 | 4 | 1.93 | 5 | 2.9 |
| CaO | 8 | 0 | 9 | 9 | 4.76 | 3.4 | 1.4 |
| SrO | 0 | 19.8 | 0 | 3.8 | 6.84 | 5 | 4.3 |
| BaO | 0 | 29.4 | 6 | 3 | 8.1 | 12.8 | 11.4 |
| ZnO | | | | | | | 10.2 |
| $ZrO_2$ | 0 | | 5 | 2 | 3.13 | 2 | 0 |
| $P_2O_5$ | 0 | | | | | | |
| $Sb_2O_3$ | | | | | | | |
| $SO_3$ | 0.2 | | | 0.2 | | 0.2 | |
| $As_2O_3$ | | | | | | | |
| Cl | | 0.5 | | | | | |
| F | | 0.3 | | | | | |
| strain point(° C.) | 511 | 629 | 525 | 623 | 584 | 587 | 551 |
| transition point(° C.) | | | | | | | |
| annealing point(° C.) | 554 | 667 | 560 | 652 | 624 | 628 | 599 |

TABLE 3-continued

| Classification | Comparative Example | | | | | | |
|---|---|---|---|---|---|---|---|
| | 1 | 2 | 3 | 4 | 5 | 6 | 7 |
| softening point(° C.) | 740 | 818 | 767 | 838 | 830 | 851 | 754 |
| thermal expansion coefficient($\times 10^{-7}$ ° C.) | 87 | 79.9 | 88.3 | 83.7 | 83 | 85 | 108 |
| dielectric constant(1 MHz) | 7.6 | | | | 7.9 | | |
| melting temp.(° C.): 100 poise | 1,470 | 1,295 | 1,432 | 1,576 | 1,536 | 1,560 | 1,223 |
| working temp. (° C.): 10,000 poise | 1,044 | 1,027 | 1,050 | 1,162 | 1,147 | 1,161 | 956 |
| liquidus temp.(° C.) | 998 | 1,035 | 1,075 | 1,104 | 1,057 | 1,110 | 1,120 |
| viscosity(poise at liquidus temp.) | 22,387 | 12,450 | 6,456 | 27,542 | 53,703 | 19,952 | 794 |

According to several Examples 1~6 of the glass composition of this invention, the strain points and thermal expansion coefficients can fully meet the physical properties of the glass for plasma display panel and this invention is adequate for the float process in that the working temperature equivalent to 10,000 poise is less than 1,200° C., and the liquidus temperature, which is lower than the working temperature, shows the viscosity of more than 20,000 poise. In particular, the Example 4 is considered to be most desirable. Since the Comparative Examples 4~6 show that the melting temperatures are higher than these of the Examples as a whole, it is expected that the melting phenomenon associated with the refractory erosion may significantly decrease the life of the melting furnace. According to the Comparative Examples 2, 3 and 7, their melting temperatures are extremely low and thus, the productivity may be very poor since the liquidus temperature is higher than working temperature. In particular, the Comparative Example 7 shows that since the addition of ZnO is, on the contrary, responsible for inducing poor physical properties of glass such as the strain point, thermal expansion coefficient, etc. as a whole, it is not adequate for the glass for PDP.

According to this invention, the glass composition for plasma display panel is highly effective in that a) sine the liquidus temperature is lower than the working temperature, a higher viscosity at a liquidus temperature results in enhancing better productivity, b) the glass composition of this invention has a high strain point and low expansion coefficient compared to the conventional soda lime silicate based float sheet glass, and c) the glass composition of this invention does not contain any high-priced chemicals, compared to other substrate glasses.

What is claimed is:

1. A glass composition for a plasma display comprising: 56.0~63.0 wt % of $SiO_2$, 1.0~4.92 wt % of $Al_2O_3$, 3.0~7.0 wt % of $Na_2O$, 3.0~8.0 wt % of $K_2O$, 3.0~5.0 wt % of MgO, 4.0~8.0 wt % of CaO, 7.0~13.0 wt % of BaO, 3.0~8.0 wt % of $ZrO_2$, and 0.3~0.5 wt % of $Sb_2O_3$ and $SO_3$, wherein said glass composition has a working temperature less than 1,200° at 10,000 poise viscosity, a liquidus temperature less than 1,100° C., and a viscosity higher than 20,000 poise at the liquidus temperature.

2. The glass composition according to claim 1, wherein said glass composition has a strain point of 580~610° C., a transition point greater than 610° C., and a thermal expansion coefficient at 30~350° C. of 80~87$\times 10^{-7}$/°C.

3. The glass composition according to claim 1, with the proviso that SrO is absent from the composition.

4. The glass composition according to claim 3, with the proviso that SrO is absent from the composition.

5. The glass composition according to claim 1, with the proviso that ZnO, $As_2O_3$ and F are absent from the composition.

6. The glass composition according to claim 3, with the proviso that ZnO, $As_2O_3$ and F are absent from the composition.

7. The glass composition according to claim 1, wherein the plasma display panel is manufactured by a floating process.

* * * * *